Feb. 5, 1924.
J. GRIJALVA
1,482,681
SHOCK ABSORBER
Filed April 30, 1923
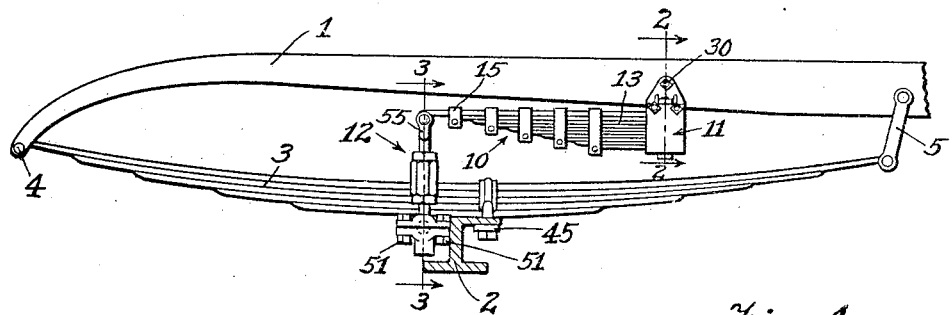
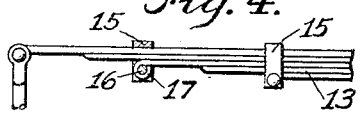
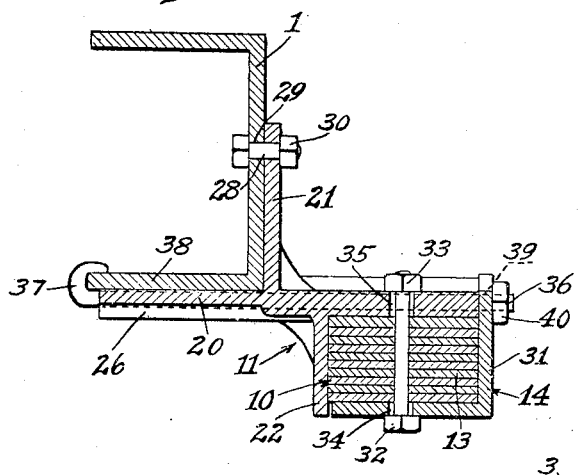
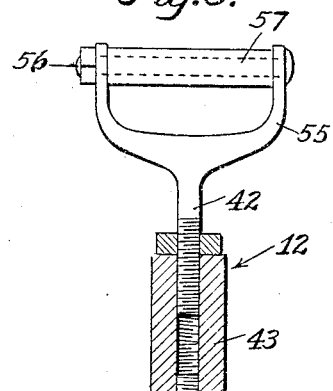
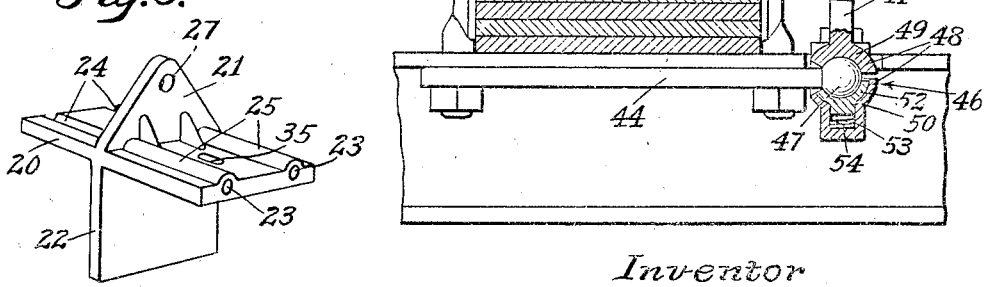
Inventor
Joseph Grijalva
By A. K. Martell
Att'y.

Patented Feb. 5, 1924.

1,482,681

UNITED STATES PATENT OFFICE.

JOSEPH GRIJALVA, OF LOS ANGELES, CALIFORNIA.

SHOCK ABSORBER.

Application filed April 30, 1923. Serial No. 635,606.

*To all whom it may concern:*

Be it known that I, JOSEPH GRIJALVA, a citizen of the United States, residing at Los Angeles, in the county of Los Angeles and State of California, have invented new and useful Improvements in Shock Absorbers, of which the following is a specification.

My invention relates to shock absorbers, and particularly to a shock absorber adapted to be used on automobiles in connection with the automobile springs to absorb the shock of the rebound of said springs, and the main object of my invention is to provide a shock absorber of this type which will be simple in construction and efficient in operation.

Other objects and advantages will appear hereinafter, and while I show herewith and will describe a preferred form of construction, I desire to be understood that I do not limit my invention to such form, but that various changes and adaptations may be made therein without departing from the spirit of my invention as hereinafter claimed.

Referring to the drawing:

Fig. 1 is a side view of my shock absorber applied to an automobile spring.

Fig. 2 is a transverse vertical section of my shock absorber taken on line 2—2 of Fig. 1.

Fig. 3 is a transverse vertical section taken on line 3—3 of Fig. 1.

Fig. 4 is a fragmentary view partly in elevation and partly in section of my shock absorber.

Fig. 5 is a perspective view of the bracket for supporting my shock absorber on the chassis of an automobile.

Corresponding reference numerals designate the same parts throughout the several views.

In the drawing I show the forward portion of an automobile chassis 1, an automobile axle 2, and a spring 3 secured to said axle and connected at its forward end to the forward end of said chassis as at 4, and at its rear end to said chassis by a link 5.

My shock absorber includes a leaf spring 10, a bracket 11 for securing the rear end of said spring to the chassis 1 rearwardly of axle 2, and a connecting element 12 for connecting the forward end of said spring to the automobile spring 3 forwardly of and adjacent said axle.

The spring 10 is a flat leaf spring comprising a plurality of leaves 13, laid flat side horizontal one upon the other, the uppermost leaf being the longest and the next remaining leaves being progressively shorter. The rear or thick end of the spring 10 including all the leaves is clamped in the bracket 11 by a clamp 14. The forward or springing end of each leaf 13 except the uppermost, is strapped to the leaves above it by a strap 15, which extends around said leaves and is held in position by a bolt 16, which extends through an eye 17 formed on said forward end of said leaf.

The bracket 11 is of unique construction, comprising a horizontal base plate member 20, a vertical securing member 21 upstanding from said member 20, and a vertical clamp member 22 depending from said member 20. In the lower side of the plate member 20 are formed a pair of bores 23—23 extending from the member 21 to the outer edge of said member 20, and in the upper side of the member 20 are formed a pair of grooves, 24—24, extending from the member 21 to the inner edge of the member 20, the bores 23—23 being aligned respectively with the grooves 24—24 and the plate 20 being embossed upwardly as at 25—25 to provide for the bores 23—23 and embossed downwardly as at 26—26 to provide for the grooves 24—24.

The member 21 is provided with a bolt aperture 27. The bracket 11 is placed with the inner portion of member 20 resting against the under side of the chassis 1 and with the inner side of the member 21 resting against the outside of said chassis and the bracket is bolted to the chassis by a bolt 28 extending through aperture 27 and an aperture 29 in the side of the chassis, and a nut 30 screwing on the outer end of said bolt against said member 21. The clamp 14 comprises an angle member 31, the member 22, the member 20 outwardly from member 22 and a bolt 32 and nut 33.

The rear end of the spring 10 is clamped between the clamp members 31 and 20 and 22 by means of the bolt 32 and nuts 33, which bolt extends through an aperture 34 in the lower part of member 31, through the leaves of the spring 10 and through an aperture 35 in the member 20, and said nut screws on the upper end of said bolt against the upper side of the member 20.

Bolts 36—36 extend respectively through the bores 23—23 and the corresponding grooves 24—24 respectively, on the inner ends of which bolts are formed hooks 37—37 which hook over the inner edge of the lower member 38 of the chassis 1.

The outer ends of the bolts 36—36 extend through apertures 39—39 in the upper part of the outer member of clamp member 31 and nuts 40—40 screw on the outer ends of said bolts 36—36 against the outer side of said clamp member, whereby the bracket 11 is further secured to the chassis 1 and the clamp member 31 is securely clamped against the spring 10.

The connecting element 12 is formed in three parts namely, rods 41 and 42 and a turnbuckle 43, which screws on the lower and upper threaded ends of said rods, by means of which turn buckle the element 12 may be adjusted as to length. The lower end of the rod 41 is connected to the lower member 44 of one of the clamps 45, which clamps the spring 3 to the axle 2 by means of a ball and socket joint 46, the ball 47 of which joint being formed on the end of clamp member 44 and the socket 48 of said joint being located on the lower end of said rod 41. The socket 48 is formed in two sections, an upper section 49 which is formed on the lower end of rod 41 and a lower clamp section 50, which is bolted to section 49 around the ball 47 by bolts 51—51.

A spring-pressed bearing member 52 is mounted within the lower socket member 50, said socket member having a recess 53 therein to receive the lower portion of said bearing and a spring 54 which engages said bearing and urges it into contact with ball 47 and takes up wear and prevents rattling of the joint 46.

On the upper end of the rod 42 is formed a fork 55 through the arms of which extend a bolt 56, which bolt extends through an eye 57 resting between said fork arms, which eye is formed on the forward end of the uppermost of the leaves 13 of spring 10, whereby the forward end of spring 10 is pivotally connected to the upper end of connecting element 12.

During the rebound of the automobile spring 3 the spring 10 is put under tension, thus resisting said rebound and absorbing the shock thereof.

Having described my invention I claim:

A shock absorber for automobiles comprising a spring, a bracket formed with a lower horizontal member and a vertical member, upstanding from said horizontal member, the inner portion of said horizontal member resting against the under flange of said chassis, and said vertical member resting against the outside of said chassis, said lower member being provided with grooves, bolts resting in said grooves, hooks on the inner ends of said bolts for engaging the inner edge of the lower flange of said chassis, a clamp on the outer part of said lower member through which the outer ends of said bolts extend, nuts on the outer ends of bolts for engaging said clamp to clamp one end of said spring, and means for connecting the other end of said spring to the automobile axle.

JOSEPH GRIJALVA.